Nov. 27, 1962 S. B. TOPF 3,065,767
REVERSIBLE PIPE CAP
Filed Nov. 30, 1959

INVENTOR.
SAM B. TOPF
BY Salvatore G. Militana
attorney

United States Patent Office 3,065,767
Patented Nov. 27, 1962

3,065,767
REVERSIBLE PIPE CAP
Sam B. Topf, Coral Gables, Fla., assignor to Jordan Industries, Inc., Miami, Fla., a corporation of Florida
Filed Nov. 30, 1959, Ser. No. 856,293
1 Claim. (Cl. 138—89)

This invention relates generally to closures and is more particularly directed to reversible pipe caps or covers for exposed pipes or conduits during the construction of a building.

During the normal construction of a building, pipes, conduits and the like which have been laid in an exposed and unconnected condition to other pipes and conduits, are in a constant danger of having concrete, mortar, debris and other foreign matter falling into the open ends of the conduits and pipes.

As in the case of wet cement and mortar falling into the pipes and conduits, the wet cement and mortar will set and harden therein so that it becomes extremely difficult task to remove the obstruction within the pipes. In any event, there is a considerable waste of man hours of work cleaning out such conduits and pipes in each building during the construction thereof.

Therefore, a principal object of the present invention is to provide a reversible cap or cover to be used to cover pipe ends during the construction of a building in order to prevent foreign matter such as cement, dirt and the like from falling into and clogging the pipes or conduits.

Another object of the present invention is to provide a reversible pipe cap or cover which is constructed and arranged to fit over the top of the pipe engaging the outside surface of the pipe to protect the threaded portion thereof or fit within the pipe so as to engage the inside surface of the pipe.

Another object of the present invention is to provide a reversible pipe or conduit cap or cover of any desired cross sectional configuration, which is made of plastic material and is inexpensive in cost so that they may be destroyed or disposed after being used.

A still further object of the present invention is to provide a pipe cover or cap which may be used on pipes of different internal and external diameters so that a few such caps of various sizes will suffice to cover the pipes or conduits on the usual building structure.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as much changes or modifications mark no material departure from the salient features of the invention as expressed in the appended claim.

Figures 4, 5, 6:
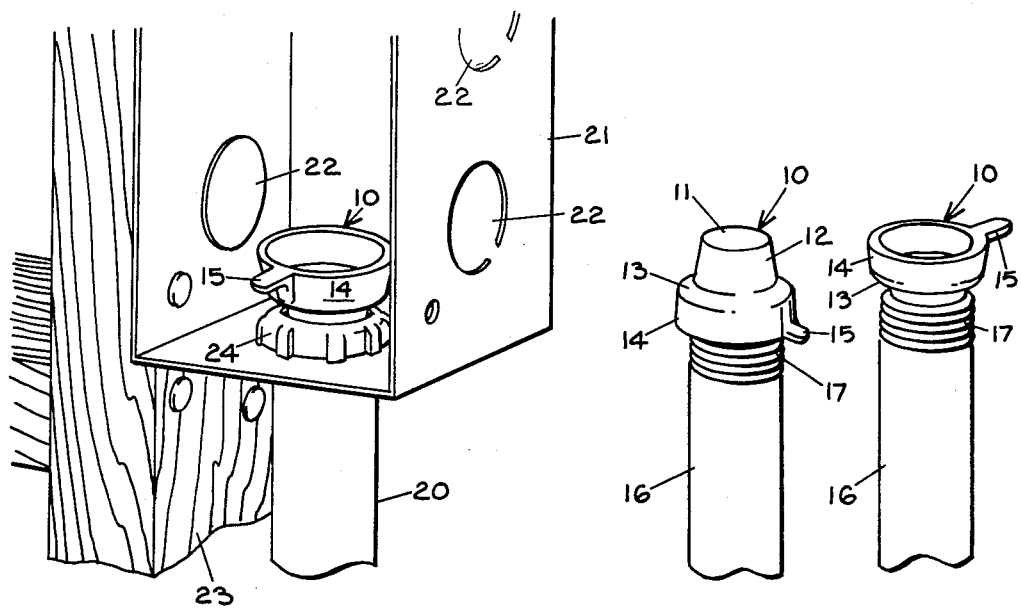
FIGURE 4 is a perspective view of a pipe shown with my cap fitted over the top thereof.
FIGURE 5 is a similar view of the same pipe with my cap fitted within the opening of the pipe.
FIGURE 6 is a perspective view of an electric junction box in which a conduit extends with my cap covering the open end of the electric conduit.
Figures 1, 2, 3:
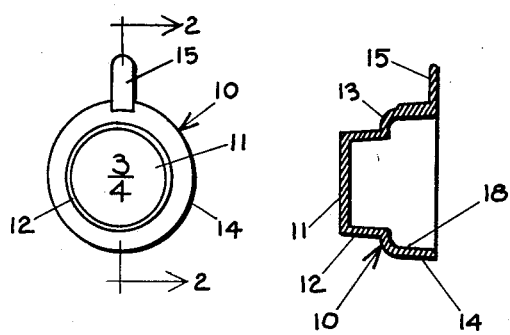
FIGURE 1 is a top plan view of a pipe or conduit cap embodying my invention.
FIGURE 2 is a cross sectional view taken along the line 2—2 of FIGURE 1.
FIGURE 3 is a bottom plan view.

Referring to the drawing wherein like numerals are used to designate similar parts throughout the several views, the numeral 10 refers generally to my pipe cap or cover which consists of a top wall 11 on which is imprinted size, manufacturer, etc. and an outwardly tapered side wall 12 extending about the edge of the top wall 11. At the bottom edge of the side wall 12 there is an outwardly extending shoulder 13 joining the top edge portion of a second outwardly tapered side wall 14 thus forming a cup like portion 18. At the lower edge of the side wall 14 there is a tab 15 attached thereto. The purpose of the tab 15 is to provide means for easily grasping the pipe cover 10 in removing the latter from its position on a pipe or conduit 16. My pipe cap 10 is preferably made of polyethylene plastic, although any other suitably flexible material may be used.

The diameter of the top wall 11 is substantially equal to that of the inside diameter of the pipe or conduit 16 so that the cover 10 will readily fit into the open end of the pipe 16 as best shown by FIGURE 5. The flexible material of which the cap 10 is made and the outwardly tapered side wall 12 will cause the cap 10 to fit snugly and securely within the open end of the pipe or conduit 16. Normally the cap 10 is pushed into the open end of the conduit 16 until the shoulder 13 abuts against the top edge of the pipe 16.

If it is found necessary to also protect threads 17 positioned about and adjacent to the open end of the pipe 16, the reverse end of the pipe cap 10 is utilized.

As shown by FIGURE 4, the cap 10 is fitted over the open end of the pipe 16 with the inside wall of the side wall 14 engaging the threaded portion 17 of the pipe 16. The cap 10 is pushed down over the open end of the pipe 16 until the top edge of the pipe 16 abuts against the inside wall of the shoulder 13, the length of the side wall 14 being sufficient to cover and protect the threaded portion 17. The diameter at the bottom edge of the tapered side wall 14 is approximately equal to the outside diameter of the pipe or conduit 16. Since the side wall 14 is tapered inwardly in an upward direction, it will engage the outside surface of the pipe 16 snugly and extremely securely as the material of which the cap 10 is made is somewhat flexible.

When it is desired to remove the pipe cap or covering 10, whether mounted as a plug on the pipe 16 as shown by FIGURE 5 or as a cap as shown by FIGURE 4, a person need only to grasp the tab 15 with his fingers or by the use of a tool such as pliers and pulls the cap 10 forcibly away from the pipe 16.

The cap or cover 10 is especially useful on electric conduits 20, one of which is shown by FIGURE 6 entering a junction box 21 through one of the knockout openings 22. The junction box 21 is secured to a partially completed wall structure or studding 23 shown only in part by FIGURE 6. A lock collar 24 threadedly mounted on the free end of the electric conduit 20 secures the conduit 20 in place within the junction box 21. To protect against dirt or other foreign matter entering the electric conduit 20, a pipe cap 10 is pushed into the open end of the conduit 20 with the side wall 12 engaging the inner surface of the lock collar 24 and conduit 20. Any debris that falls into the junction box 21 cannot enter the electric conduit 20 but will instead fall into the cup portion 18 of the conduit cap 10, which dirt is removed when the cap 10 is extracted from its position on the free end of the electric conduit 20.

Also, if the threaded ends 17 of the conduits 16 are not covered by the cap 10 as shown by FIGURE 4, cement or mortar falling on the threads 17 will harden thereon.

In order that the conduit 16 can be connected the hardened cement must be removed by wire brushing the threads 17 until the cement or mortar is entirely removed.

What I claim as new and desire to secure by Letters Patent of the United States is:

A disposable closure constructed of a yieldable substance for open ended pipes, conduits and the like comprising a plurality of axially aligned hollow frusto-cones, said frusto-cones extending in the same direction and having smaller base portions, a base portion of the smallest frusto-cone being smaller than and coplanar with the base portion of the next succeeding frusto-cone, a disc capping the end of said smallest frusto-cone, an annular ring portion joining the coplanar base portions of said frusto-cones, the inner surface of each frusto-cone being substantially parallel to the outer surface of its frusto-cone, said exterior frusto-conical surface of the small frusto-cone serving to close the open ends of a given range of pipes of different internal diameters when the frusto-cone is inserted axially, and said interior frusto-conical surface of the large frusto-cone serving to close the open ends of a given range of pipes of different external diameters when the corresponding frusto-cone is telescoped axially thereover.

References Cited in the file of this patent

UNITED STATES PATENTS

| | | |
|---|---|---|
| 658,313 | Bernardi | Sept. 18, 1900 |
| 834,906 | Hermann | Nov. 6, 1906 |
| 1,026,282 | Schmitt | May 14, 1912 |
| 1,240,188 | Finley | Sept. 18, 1917 |
| 1,758,126 | Peterson | May 13, 1930 |
| 1,783,893 | Unke | Dec. 2, 1930 |
| 2,168,734 | Freeman | Aug. 8, 1939 |
| 2,196,785 | Takiquchi | Apr. 8, 1940 |
| 2,573,552 | Detzel | Oct. 30, 1957 |
| 2,930,409 | Higgins | Mar. 29, 1960 |

FOREIGN PATENTS

| | | |
|---|---|---|
| 1,164,847 | France | May 19, 1958 |